(12) United States Patent
Strachan

(10) Patent No.: US 11,798,236 B2
(45) Date of Patent: Oct. 24, 2023

(54) AUGMENTED REALITY SYSTEM AND METHOD

(71) Applicant: Mark Strachan, Westlake Village, CA (US)

(72) Inventor: Mark Strachan, Westlake Village, CA (US)

( * ) Notice: Subject to any disclaimer, the term of this patent is extended or adjusted under 35 U.S.C. 154(b) by 0 days.

(21) Appl. No.: 17/187,818

(22) Filed: Feb. 28, 2021

(65) Prior Publication Data

US 2021/0272370 A1 Sep. 2, 2021

Related U.S. Application Data

(60) Provisional application No. 62/983,429, filed on Feb. 28, 2020.

(51) Int. Cl.
*G06T 19/00* (2011.01)
*G06F 3/01* (2006.01)
*G06F 3/04815* (2022.01)

(52) U.S. Cl.
CPC ............ *G06T 19/006* (2013.01); *G06F 3/011* (2013.01); *G06F 3/04815* (2013.01)

(58) Field of Classification Search
CPC .... G06T 19/006; G06F 3/011; G06F 3/04815; G10G 1/02; G10G 1/00; G10H 2220/071; G10H 2220/106; G10H 2220/131; G10H 1/38; G10H 2210/571; G10H 2220/005; G10H 2220/401
See application file for complete search history.

(56) References Cited

U.S. PATENT DOCUMENTS

| | | | |
|---|---|---|---|
| 8,854,470 B2 | 10/2014 | Park et al. | |
| 9,679,547 B1* | 6/2017 | Zund | G06K 9/78 |
| 9,754,570 B2* | 9/2017 | Strachan | G10H 1/38 |
| 9,788,714 B2 | 10/2017 | Krueger | |
| 10,078,917 B1 | 9/2018 | Gaeta et al. | |
| 10,169,924 B2 | 1/2019 | Rosenthal et al. | |
| 10,231,614 B2 | 3/2019 | Krueger | |
| 10,565,796 B2 | 2/2020 | Hagbi et al. | |
| 2005/0190199 A1* | 9/2005 | Brown | G10H 3/125 345/600 |
| 2006/0156906 A1* | 7/2006 | Haeker | G10H 1/0066 84/609 |
| 2008/0264241 A1* | 10/2008 | Lemons | G10L 21/06 84/601 |
| 2008/0271591 A1* | 11/2008 | Lemons | G09B 15/023 84/601 |
| 2013/0220101 A1* | 8/2013 | Lemons | G09B 15/026 84/483.2 |
| 2023/0154445 A1* | 5/2023 | Bauer | G06T 19/006 84/609 |

FOREIGN PATENT DOCUMENTS

CN 110910712 A * 3/2020 ............. G06F 3/014

* cited by examiner

*Primary Examiner* — Chante E Harrison
(74) *Attorney, Agent, or Firm* — Paul D. Chancellor; Ocean Law

(57) ABSTRACT

Augmented reality is used to visualize musical notes or groups of musical notes for example using a display proximate a user's eyes, for example where images in the display appear to be in a space in front of or around the user, for example where the images in the display are for manipulation by an augmented reality controller, for example where the augmented reality controller is held by the user.

2 Claims, 4 Drawing Sheets

AUGMENTED REALITY SYSTEM AND METHOD

PRIORITY CLAIM AND INCORPORATION BY REFERENCE

This application claims the benefit of U.S. Prov. Pat. App. No. 62/983,429 filed Feb. 28, 2020 and titled AUGMENTED REALITY SYSTEM AND METHOD. This application incorporates by reference in their entireties and for all purposes U.S. Pat. Nos. 8,854,470, 9,788,714, 10,078,917, 10,169,924, 10,231,614, and 10,565,796.

BACKGROUND OF THE INVENTION

Field of the Invention

The invention relates to the field of manufactured computing devices. More particularly, the present invention relates to computing devices, software, and displays for presenting scenes akin to but different from reality.

Description of the Related Art

Augmented reality typically blends interactive digital elements into real-world environments. Applications include navigation systems superimposing a route over the live view of the road, sports presentations where lines dawn on the field illustrate and analyze plays, and aircraft pilots who see aircraft data on their helmet visor.

SUMMARY OF THE INVENTION

Augmented reality is used to visualize musical notes. In an embodiment, an augmented reality system comprises: an octave of musical notes selected by a user; the octave traversing a single loop; a prompt to place the loop or coil in a particular position; wherein 12 tetrads form a coil around the position such that the user may walk around with an outstretched arm holding an augmented reality controller allowing them to either roll over or select a tetrahedron. In an embodiment, an augmented reality system comprising: a display proximate a user's eyes, images in the display appearing to be in a space in front of or around the user, the images in the display for manipulation by an augmented reality controller held by the user; in the display, an image of an octave of musical notes selected by a user; the notes laid out in sequence along a spiral path; and, the notes depicted by tetrahedrons that point in a direction along the spiral path of increasing frequency; a tetrahedron color that indicates a distance from a chosen root note of a musical scale; wherein the user walks around with an outstretched arm holding the augmented reality controller and manipulating the augmented reality controller to allow a rolling over or a selection of one or more tetrahedrons.

BRIEF DESCRIPTION OF THE DRAWINGS

The present invention is described with reference to the accompanying figures. These figures, incorporated herein and forming part of the specification, illustrate the present invention and, together with the description, further serve to explain the principles of the invention and to enable a person skilled in the relevant art to make and use the invention.

DETAILED DESCRIPTION OF THE PREFERRED EMBODIMENT

The present invention involving augmented reality ("AR") is described with reference to the accompanying figures. These figures, incorporated herein and forming part of the specification, illustrate the present invention and, together with the description, further serve to explain the principles of the invention and to enable a person skilled in the relevant art to make and use the invention.

Figure 1:
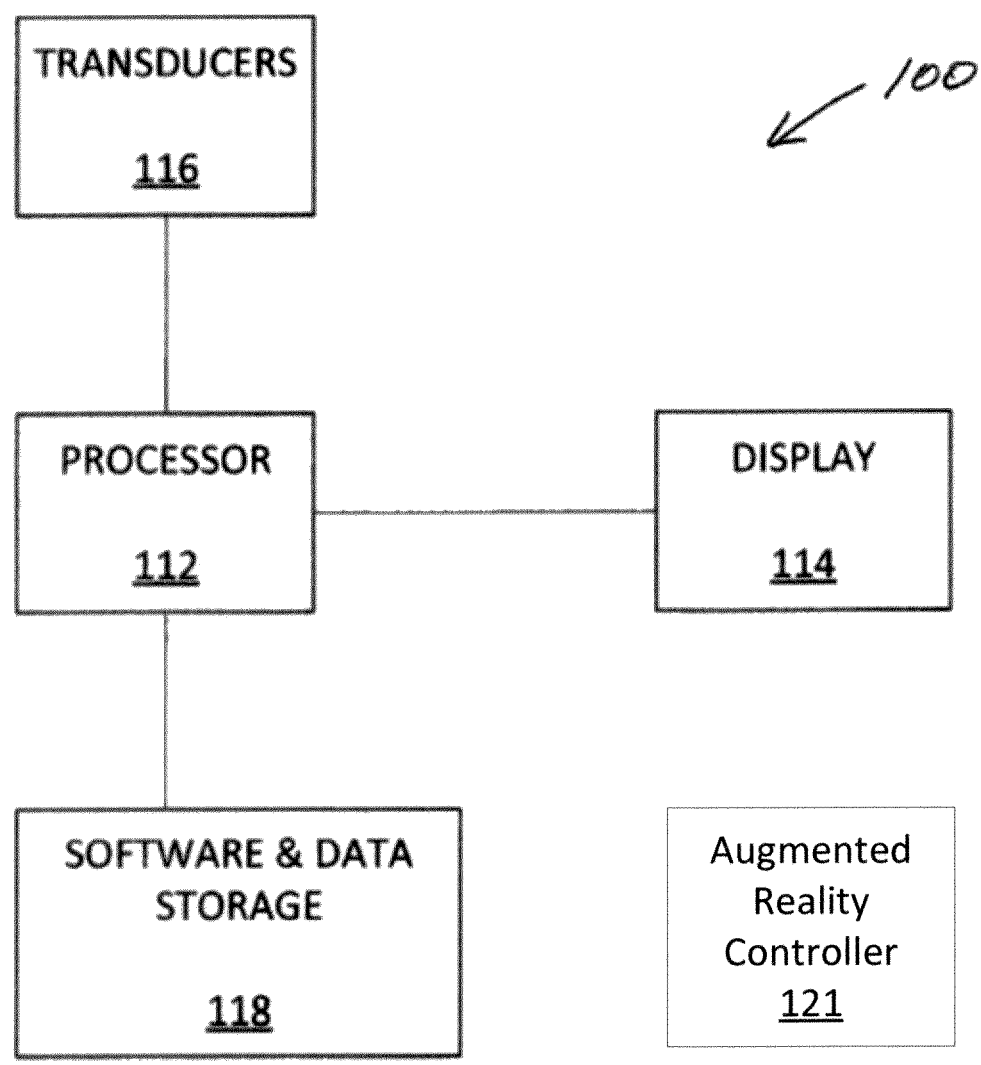
FIG. 1 shows an augmented reality system in accordance with the present invention.

FIG. 1 shows an augmented reality system 100. A processor 112 running augmented reality software and accessing data 118 receives environmental signals and inputs from transducers 116 in order to produce in a display 114 altered versions of visualized reality.

The disclosure provided in the following pages describes examples of some embodiments of the invention. The designs, figures, and descriptions are non-limiting examples of certain embodiments of the invention. For example, other embodiments of the disclosed device may or may not include the features described herein. Moreover, disclosed advantages and benefits may apply to only certain embodiments of the invention and should not be used to limit the disclosed invention.

Augmented Reality—Multi Dimensional Multi Select.

General Definition

Embodiments of the invention which may be implemented in software allow the user to represent multiple dimensions of a discrete range of numbers and to quickly select an ordered list of elements each of which is a coordinate in the space spanned by the dimensions. Spatial reorganization may be used to prioritize access to important information within the space. The user may annotate the data with graphic decorators that assist the user with decisions concerning selection of the ordered list of elements.

Musical Note Selection

In an embodiment of the invention, the user selects musical notes within an octave. In further embodiments of the invention, any range of discrete values can be represented, for example, by the 12 notes of a musical octave.

Figure 2A:
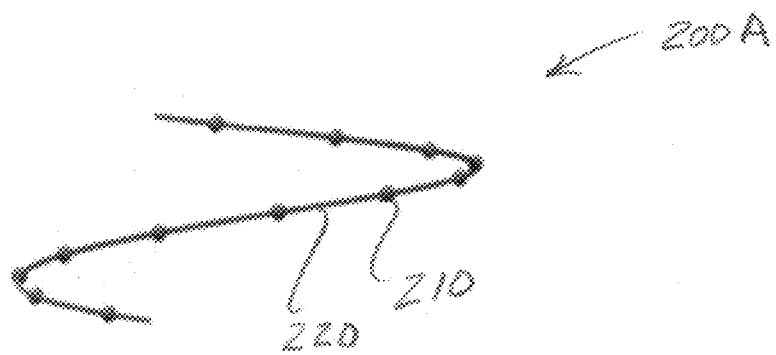
FIG. 2A shows musical notes on a loop or spiral.

In FIG. 2A, a spiral 200A is shown. Here, musical notes 210 or a single dimension of musical notes warps the octave into a single loop or spiral 220. The loop may connect as a circle, or may be broken with vertical displacement, creating a single winding of a spiral.

Figure 2B:
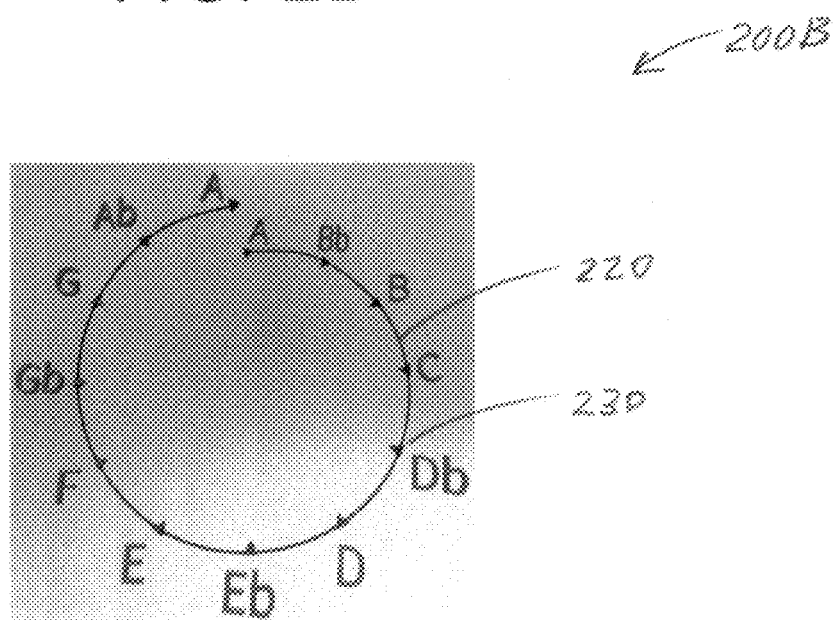
FIG. 2B shows particular musical notes on a loop or spiral where moving from the lower note A to the upper note A is a doubling of frequency.

In FIG. 2B, a spiral with particular notes is shown 200B. Here, specific values 230 (e.g., notes) are chosen along the continuous loop to present values for selection.

Figure 2C:
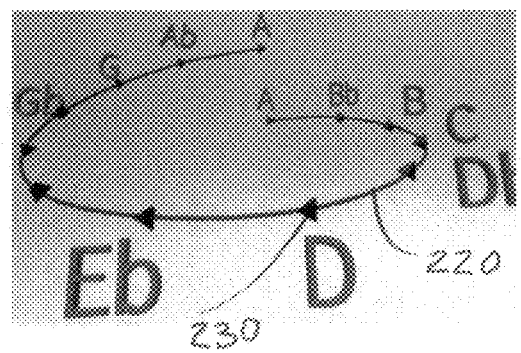
FIG. 2C shows tetrahedrons at note locations on a loop or spiral.

In FIG. 2C, a spiral of notes indicated by tetrahedrons is shown 200C. Here, specific values may be represented by a graphical element such as a tetrahedron 230 which can be drawn with 4 flat triangles.

Figure 2D:
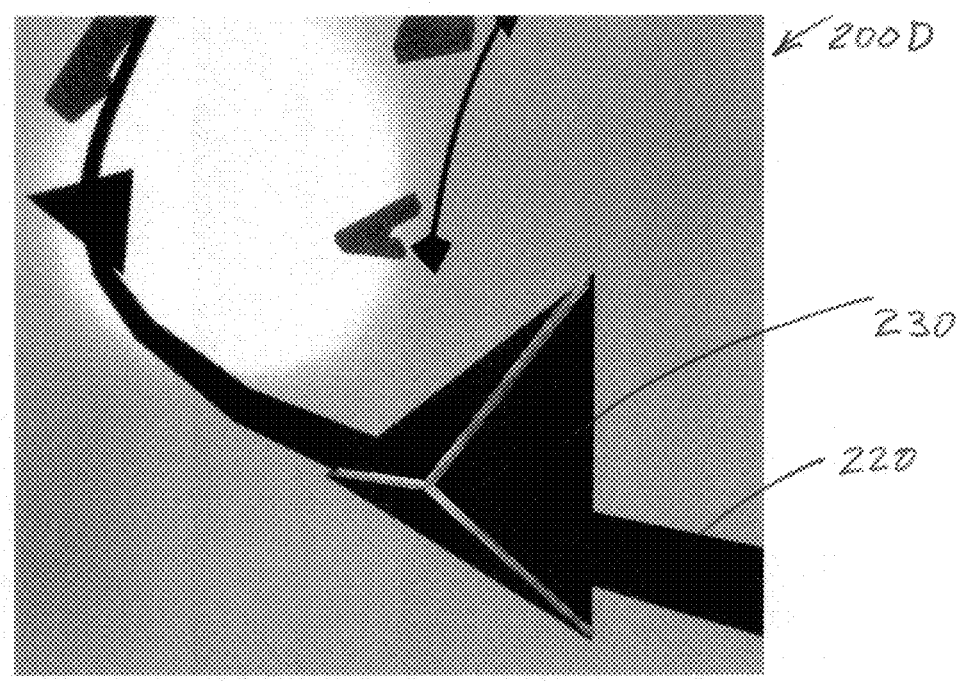
FIG. 2D shows a particular tetrahedron at a note location on a loop or spiral.

In FIG. 2D, a tetrahedron 230 marking a particular location is shown 200D. The tetrahedron can be oriented such that it has axes used as pointers and perceivable by the user which can indicate orientation.

Figure 2E:
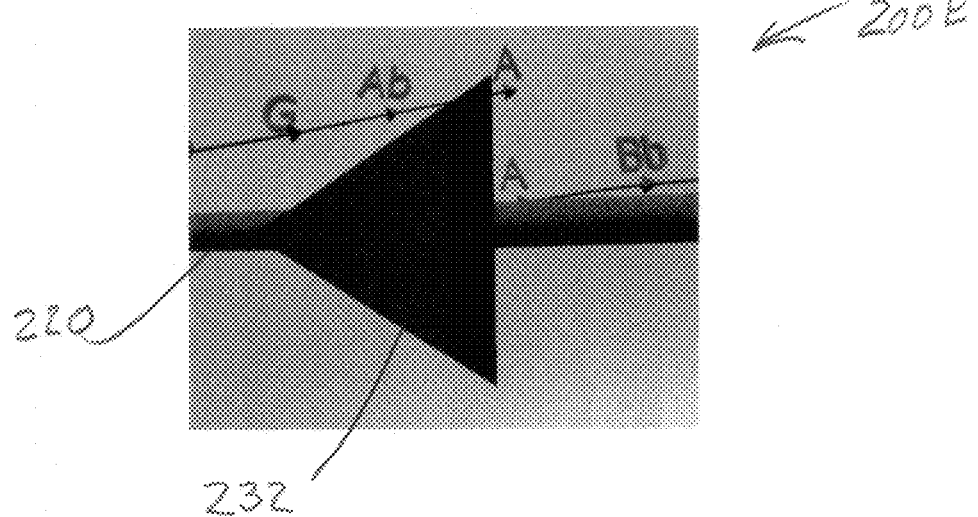
FIG. 2E shows a tetrahedron at a note location on a loop or spiral pointed to the left.

In FIG. 2E, a first tetrahedron pointer is shown 200E. In this side view, the tetrahedron 232 points to the left to higher frequencies.

Figure 2F:
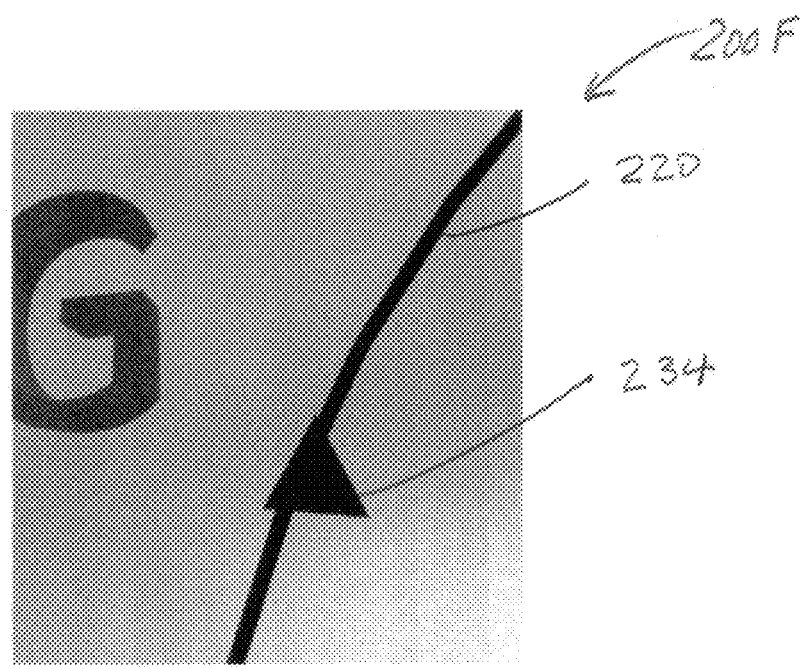
FIG. 2F shows a tetrahedron at a note location on a loop or spiral pointed upwards.

In FIG. 2F, a second tetrahedron pointer is shown 200F. In this view from above, the tetrahedron 234 points upward to higher frequencies.

In various embodiments, the tetrahedrons are assigned a color. In the case of musical notes, the chosen coloration indicates a distance from a chosen 'root' note of a musical scale. Thus, the color describes the interval distance from the root note of a scale. When the root changes, the selected color changes.

Space Configuration

When a user selects multi-dimensional multi select, they are prompted to place the first-dimension loop or coil. This places 12 tetrads in a coil around the position selected by the user. The user may then walk around, with an outstretched arm, holding an augmented reality controller or hand representation that allows them to either roll over or select a tetrahedron. During a roll-over, the user may 'audition' the data associated with the tetrahedron selected by the rollover.

Path Selection

If the user 'selects' a tetrahedron, for example using an event from a controller or hand gesture, the system will draw a highlight sphere over the tetrahedron to indicate it is selected. If prior objects have been selected, the system will draw a line segment from the previously selected object to the newly selected object. The line segment may be tapered, to imply direction. Additionally, the line segment may be decorated with colors to convey additional information to the user regarding the differences between the previously and newly selected objects.

Additional Dimensions

Once a single dimension of objects has been set up in the AR space, a new dimension may be added, by centering a new coil around each existing tetrahedron and by drawing a new coil around each existing tetrahedron. These new coils will be oriented orthogonally to the original coil. This has the effect of orienting the new tetrads as if they are painted around the surface of a torus like shape, given that the torus may not have a closed surface, due to the open ends of the coils. This process may be repeated for an arbitrary number of dimensions. With each additional dimension applied, the total number of tetrahedrons increases by a factor of 12. The scale of each additional dimension, as represented in the 3 dimensions of augmented reality, necessarily gets smaller with each new dimension. In order for the user to browse smaller and smaller dimensions, the system provides them with the ability to zoom in. When an element is selected in a 'smaller' dimension, also selected are elements in all larger dimensions that correspond to that coordinate. This means that selection of a single tetrahedron indicates selection of a set of coordinates, thus allowing the user to simultaneously select n notes in n multiple dimensions, which provides provably faster selection than selection of a single number n times in n multiple dimensions.

Space Warping and Selection Support Tools

The system provides tools to 'warp' the space to make decision and selection tasks easier, simpler and more efficient. In an embodiment of the invention, the user has 6 dimensions actively represented. In the first embodiment, the user may select the center tetrad for dimension 4, and locally expand dimensions 5 and 6 for that object, enabling selection of elements from dimensions 5 and 6. The system shall also provide the user with tools to filter the complete set of tetrahedrons, to simplify selection. In the first embodiment of the invention, the user can filter all dimensions by 'musical key.' This removes elements from each coil in the application. Where dimensions are nested and the central supporting tetrahedron is turned off, the entire sets of lower dimensions are also removed. This enables the filters to be applied selectively to make the general space sparsely populated with notes that are 'in key' notes.

Further and other embodiments of augmented reality allow for additional warping and filtering mechanisms to be applied to the selection space. The system may decorate tetrahedrons with additional information using shaders or additional mesh driven augmented reality objects that enable users to make better informed decisions about tetrahedrons. This can include, for example, color associations for groups of tetrahedrons across dimensions, like triad coloration over the third dimension. Other shapes can be applied to the space like note names, and guide paths that show organizing information in the selection space for decision support.

Implications of Paths

The system may both allow the user to select a sequence of elements in the space (representing harmonic and melodic sequences) and may also draw sequences for the user illustrating mathematical properties of the selection space. This can further guide the user in their selection choices. For example, the system can annotate a library of chords for a given root note by drawing paths that show the relationships and grouping of the chords. If all chords are drawn for a given root note, these can all appear in 1 ring of a torus. These chord libraries can be replicated for all root notes and thus can appear distributed around the entire selection space. Other paths can be drawn. These include libraries of keys, chord progressions like the set of all major chord progressions, the set of all minor chord progressions, and any piece of music with any number of voices.

Positive and Negative Selection Space.

The space may be used as a positive selection space (i.e. a set of objects that are present in a larger set) or a negative selection space (i.e. a selection of objects that are to be removed from a space). Use of the space as a negative selection space can enable a limited number of dimensions to be used as a selection tool for a larger mathematical space.

Accessories

Additional user interfaces may work in conjunction with the selection space. In the current embodiment this includes a grid control to assign an octave number to each voice. This also includes switches for clearing key, changing mode, and changing root. Switch states are combined to specialize the configuration of the space to aid in user decision support.

While various embodiments of the present invention have been described above, it should be understood that they have been presented by way of example only, and not limitation. It will be apparent to those skilled in the art that various changes in the form and details can be made without departing from the spirit and scope of the invention. As such, the breadth and scope of the present invention should not be limited by the above-described exemplary embodiments, but should be defined only in accordance with the following claims and equivalents thereof.

What is claimed is:

1. An augmented reality system comprising:
    the augmented reality system for composing music;
    transducer(s), a processor, software and data storage, a display, and a hand-held augmented reality controller;

an octave of musical notes selected by a composer where the source of the musical notes is not live or recorded music;

the octave traverses a single loop or single open loop on the display;

a prompt to place the loop in a particular position on the display;

tetrahedrons spaced apart on the loop indicate the musical notes of the octave on the display;

at least one axis of a tetrahedron used as a pointer; and, a tetrahedron color that indicates a distance from a chosen root note of a musical scale, the tetrahedron color changing when the root note changes;

wherein the composer selects specific notes along the loop and the composer walks around with the outstretched arm holding an augmented reality controller allowing them to either roll over or select a displayed tetrahedron.

2. An augmented reality system comprising:

the augmented reality system for composing music;

a display proximate a composer's eyes, images in the display appearing to be in a space in front of or around the composer, the images in the display for manipulation by an augmented reality controller held by the composer;

in the display, an image of an octave of musical notes selected by the composer;

the notes laid out in sequence along a spiral path where the source of the musical notes is not live or recorded music;

the notes depicted by tetrahedrons that point in a direction along the spiral path of increasing frequency; and, a tetrahedron color that indicates a distance from a chosen root note of a musical scale the tetrahedron color changing when the root note changes;

wherein the composer selects specific notes along the loop and the composer walks around with an outstretched arm holding the augmented reality controller and manipulating the augmented reality controller to allow a rolling over or a selection of one or more tetrahedrons.

* * * * *